United States Patent [19]

Henry et al.

[11] Patent Number: 5,787,241
[45] Date of Patent: Jul. 28, 1998

[54] METHOD AND APPARATUS FOR LOCATING EXCEPTION CORRECTION ROUTINES

[75] Inventors: Glenn Henry; Terry Parks, both of Austin, Tex.

[73] Assignee: Integrated Device Technology, Inc., Santa Clara, Calif.

[21] Appl. No.: 574,636

[22] Filed: Dec. 18, 1995

[51] Int. Cl.$^6$ ............................................. G06F 11/00
[52] U.S. Cl. .......................... 395/181; 355/387; 355/571; 355/591
[58] Field of Search ............... 395/182.13, 182.08, 395/185.02, 800, 383, 571, 181, 701, 704, 800.01, 381, 384, 385, 386, 387, 388, 390, 561, 589, 591

[56] References Cited

U.S. PATENT DOCUMENTS

| | | | |
|---|---|---|---|
| 4,080,648 | 3/1978 | Asano | 364/200 |
| 4,875,160 | 10/1989 | Brown, III | 364/200 |
| 5,134,693 | 7/1992 | Saini | 395/375 |
| 5,193,158 | 3/1993 | Kinney | 395/375 |
| 5,204,953 | 4/1993 | Dixit | 395/400 |
| 5,479,628 | 12/1995 | Olson et al. | 395/416 |
| 5,542,109 | 7/1996 | Blomgren | 395/800 |
| 5,546,554 | 8/1996 | Yung | 395/413 |
| 5,557,772 | 9/1996 | Saka | 395/496 |
| 5,559,975 | 9/1996 | Christie | 395/375 |
| 5,559,977 | 9/1996 | Avnon | 395/375 |
| 5,560,032 | 9/1996 | Nguyen | 395/800 |
| 5,566,298 | 10/1996 | Boggs | 395/182.08 |
| 5,577,259 | 11/1996 | Alferness | 395/800 |
| 5,581,719 | 12/1996 | Steely | 395/383 |
| 5,590,294 | 12/1996 | Mirapuri | 395/591 |

*Primary Examiner*—Albert Decady
*Attorney, Agent, or Firm*—James W. Huffman

[57] ABSTRACT

An apparatus for locating exception correction routines within a control ROM of a microprocessor. A control ROM generates micro instructions that are addressable by a microprocessor. A translator generates micro instructions that do not have addresses which may be referenced. Error correction routines must be provided for micro instructions whether they are provided by a translator, or by a control ROM. Exception correction routines are stored in a control ROM at fixed offsets relative to the micro instructions for which they provide correction. For translator generated micro instructions, an address corresponding to an appropriate exception correction routine is provided to the control ROM and latched. This address may later be read from the latch should an exception condition occur.

24 Claims, 3 Drawing Sheets

METHOD AND APPARATUS FOR LOCATING EXCEPTION CORRECTION ROUTINES

BACKGROUND

1. Field of the Invention

This invention relates in general to the field of microprocessor exception handling and more particularly to a method and apparatus for locating exception correction routines associated with translator generated instructions.

2. Description of the Related Art

A primary focus of modern microprocessor design is speed or performance, i.e., how can a microprocessor be designed to allow it to execute a general sequence of instructions faster than existing microprocessors. One of the advances in computer architecture related to improving speed is the use of pipelining. Pipelining is an implementation technique whereby multiple instructions are overlapped in execution. For example, a single macro instruction may be broken down (or translated) into a sequence of micro instructions. These micro instructions may then proceed, typically one at a time, through multiple stages of execution. As one micro instruction completes a first processing stage and moves to a second stage, it is immediately followed by a second micro instruction, and then a third, etc.

For a pipeline processor to be effective, each stage of the pipeline should be filled with an executable micro instruction. If all is well, the micro instructions proceed through the stages of the pipeline, with each stage acting upon the micro instruction present at that stage. Thus, multiple stages act upon multiple micro instructions, simultaneously.

A problem occurs, however, when for some reason, one of the micro instructions in the pipeline causes a particular stage in the pipeline to wait (or stall) until it can be executed. When this occurs, it causes all of the earlier stages in the pipeline to stall, thus wasting processor time until the offending micro instruction can proceed. One example of this condition is found in processors which must translate a macro instruction into a series of micro instructions. In such a processor, what typically occurs is that a translator reads the macro instruction, and then generates an address to a control ROM which contains micro instruction sequences for each macro instruction. In some instances, addressing a micro instruction from the control ROM, and providing this instruction to the next stage in a pipeline processor, cannot be performed within a single processor clock. Therefore, the processor stalls until the control ROM provides the instruction to the next stage.

One improvement that has been made is to have the translator provide the first micro instruction in a sequence directly to the next stage, while the control ROM looks up the following micro instructions in the sequence. This improvement allows the first micro instruction to enter the $2^{nd}$ stage of the pipeline, without stalling the processor. During the next processor cycle, as the first micro instruction proceeds to the $3^{rd}$ stage, the control ROM can provide the second micro instruction in the sequence to the $2^{nd}$ stage. Thus, no stall occurs. An additional improvement that is occasionally provided is to have the translator generate a second micro instruction directly to the $2^{nd}$ stage.

While translator generated micro instructions can sometimes provide instructions faster than control ROM's (e.g., to following stages within a pipeline processor), providing instructions in this fashion can create other problems, as will be discussed below. To understand these problems, however, a brief overview of exception handling is required.

In microprocessors it is possible for errors to occur during the execution of a micro instruction. When such errors occur it is typical to have the processor branch to an exception handler. The exception handler is a program which is responsible for correcting errors, and then returning to the currently executing program. Due to the way many processors are designed, exception handlers are able to correct detected errors, and return to the currently executing program. This is because most processors do not allow the state of any of the addressable registers to be changed by a micro instruction, until first verifying that no errors will occur. This can be illustrated with the following example:

In x86 family microprocessors, instructions exist which load segment registers. One instruction is MOV SS,AX. This instruction requests the processor to move the value in register AX into the segment register SS. However, before the value of SS is changed, a number of other actions are required. First, checks are made to ensure that the value in AX does not contain a null selector. Second, a descriptor is read from memory that relates to the segment being loaded, and the descriptor is stored into temporary space. The descriptor is checked to determine whether it is a valid descriptor. If it is, then the descriptor is stored into the descriptor register associated with SS, and finally, the selector is stored in SS. It is natural to assume that conventional x86 processors load the descriptor into temporary memory for the purpose of descriptor validation, prior to storing the selector/descriptor into the register file. If a processor stored a selector directly into a segment register before validating the associated descriptor, the store would violate standard x86 architecture.

An advantage of the above sequence is that if any micro instructions create errors during the loading of the selector/descriptor above, no changes have occurred to either the DS register, or the associated descriptor register. Thus, when the exception handler is called, no modifications are required to be made to SS. This is convenient from an exception handler point of view, but such an implementation also is more time consuming for the processor, and requires more hardware within the processor.

To overcome the time delays associated with micro instructions which store values into temporary registers, and then verify that no errors will occur prior to moving the values into addressable registers, it is presumed in the present invention that for at least a portion of the micro instruction sequences, errors will not occur. With this presumption, the processing speed of a some macro instructions is improved. One example of this presumption is found in copending application, U.S. patent application Ser. No. 08/572,898, filed on Dec. 18, 1995, entitled "METHOD AND APPARATUS FOR SELECTOR RESTORATION", incorporated herein by reference. In the aforementioned co-pending application, the selector is stored immediately into the segment register (e.g., SS). If an exception error occurs during the descriptor load, a mechanism is provided for restoring the original value of the segment register.

With the above as background, it should be understood that in some instances, register values may be modified by micro instructions prior to determining whether or not an error will occur. And, when an error occurs, some mechanism needs to exist to allow the processor to be restored to its pre error state before continuing. The mechanism required is called an exception correction routine. This routine may be stored in the control ROM, and called by the exception handler as needed.

However, the exception handler must be able to locate the exception correction routine appropriate for the particular micro instruction which caused the error. But, as mentioned above, if the micro instructions are being generated by a translator, there is no address associated with the instruction. Thus, if a translator generated micro instruction creates an error condition, there is no mechanism for determining which exception correction routine is required to restore the state of the processor.

For the foregoing reasons, there is a need for a method and apparatus for locating exception correction routines for micro instructions which are generated by a translator.

SUMMARY

To address the above-detailed deficiencies, it is an object of the present invention to provide an apparatus for locating exception correction routines for both control ROM and translator generated microinstructions.

Accordingly, in the attainment of the aforementioned object, it is a feature of the present invention to provide a processor for executing macro instructions where each macro instruction is translated into micro instructions, and where the micro instructions occasionally cause the processor to generate exception errors requiring execution of exception routines, and where the exception routines occasionally require exception correction routines. The processor includes: an instruction memory, for storing the macro instructions; an instruction execution unit for executing the micro instructions; a translator, connected to the instruction memory, for receiving the macro instructions from the instruction memory, for generating first micro instructions relating to the macro instructions, and for generating a first address associated with second micro instructions. In addition a ROM is provided which is connected to the translator, for receiving from the translator the first address, and for providing as output the second micro instructions. Further, a MUX is included which, has inputs connected to the translator and to the ROM, for selecting between the first micro instructions and the second micro instructions, and outputs either of the first micro instructions or the second micro instructions for execution by the instruction execution unit. The translator generates the first micro instructions to be used as the micro instructions by the instruction execution unit, and the ROM provides the second micro instructions to alternatively be used as the micro instructions by the instruction unit. The first address associated with the second micro instructions may be used by the processor to locate the exception correction routines during execution of the exception routines.

The present invention further contemplates a processor, as mentioned above, where the MUX selects between the first micro instructions and the second micro instructions based on which of the first micro instructions or the second micro instructions is appropriate.

The present invention also contemplates a processor, as mentioned above, where the exception correction routines are located at a fixed offset address relative to the first address associated with the second micro instructions.

The present invention also contemplates a processor, as mentioned above, where the translator generates a second address when the translator generates the first micro instructions. The second address is used by the processor to locate the exception correction routines applicable to the first micro instructions.

A further feature of the present invention is to provide a microprocessor for executing macro instructions, and for occasionally executing exception routines which require exception correction routines. The microprocessor includes: a control ROM for providing micro instructions to an instruction execution unit pertaining to the macro instructions, and for storing the exception correction routines; a translator, connected to the control ROM, for receiving the macro instructions from a source thereof, and for generating an address to the control ROM, where the address includes: a first address, associated with a location within the control ROM which contains the micro instructions relating to the macro instructions; or alternatively, a second address, that is not associated with a location within the control ROM containing the micro instructions relating to the macro instructions. Both the first address and the second address are located at a fixed offset relative to the exception correction routines. Also an instruction execution unit is connected to the translator and to the control ROM, for executing the micro instructions.

An additional feature of the present invention is to provide a control unit within a processor, where the processor includes a translator and an execution unit. The control unit includes: a control ROM, connected to the translator via an address line, for storing micro instructions, for storing exception correction routines, and for providing the micro instructions to the execution unit; and a register, connected to the translator via the address line, for temporarily storing address values generated by the translator. The address values generated by the translator are used to reference the micro instructions, and the address values temporarily stored in the register are occasionally used to locate the exception correction routines.

Another feature of the present invention is to provide a method for locating exception correction routines for translator generated micro instructions. The steps of the method include: placing the exception correction routines within a control ROM at addressable locations; generating an address for translator generated micro instructions; sending the address to the control ROM; storing the generated address in a register; upon the occurrence of an exception, reading the address which was stored in the register; and determining from the address, the location of the exception correction routines.

The present invention also contemplates the above method where the step of determining includes adding to the read address a fixed offset; where the result from the step of adding provides the address for the exception correction routine.

The foregoing has outlined rather broadly the objects, features and technical advantages of the present invention so that the detailed description of the invention that follows may be better understood. Additional features and advantages of the invention will be described hereinafter which form the subject of the claims of the invention. Those skilled in the art should appreciate that they can readily use the disclosed conception and specific embodiment as a basis for designing or modifying other structures for carrying out the same purposes of the present invention.

DESCRIPTION OF THE DRAWINGS

These and other objects, features, and advantages of the present invention will become better understood with regard to the following description, and accompanying drawings where.

DETAILED DESCRIPTION

The invention described below is applicable to a variety of different computer architectures and should not be restricted to any one processor. However, to illustrate the features of the present invention, an embodiment will be discussed with reference to a pipeline processor shown in FIG. 1. Although the present invention involves only a portion of the entire processor, a brief overview of the illustrated processor pipeline stages is provided below. Following this overview, a more specific implementation of the present invention is provided.

Figure 1:
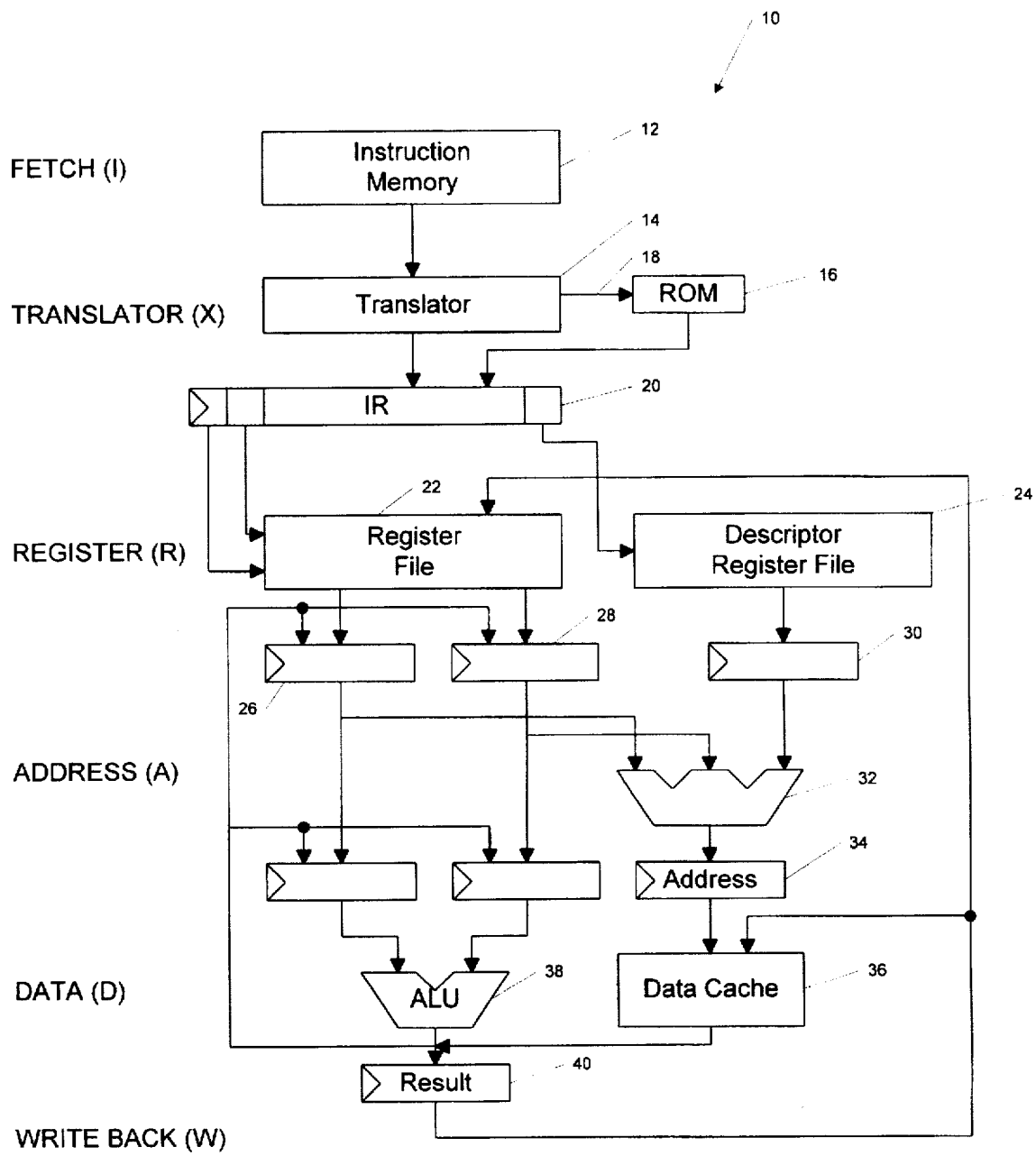
FIG. 1 is a block diagram representing an illustrative pipeline processor incorporating the present invention.

FIG. 1 depicts a 6 stage pipeline processor 10. The stages of the pipeline are: 1) Fetch instruction; 2) Translate instruction; 3) Access Registers; 4) Calculate Address; 5) Data (Load/Store or ALU); and 6) Write Back.

At stage 1, an instruction (not shown) is fetched from instruction memory 12. The instruction which is fetched is typically a macro instruction, or assembly level instruction, pertaining to an instruction set of a particular processor family. The instruction is provided to a Translator 14.

The Translator 14 interprets the macro instruction and provides an address to the ROM 16 via address line 18. The ROM 16 contains micro instruction sequences necessary to perform the functions described by the macro instructions. It should be understood by one skilled in the art that for each macro instruction, a sequence of micro instructions are typically required. It should also be understood that a micro instruction typically contains an opcode field which indicates the type of operation to be performed, such as a load, a store, or an add, along with operand fields which indicate the location (register or memory) of the data upon which operations are to be performed. The address provided to the ROM 16 by the translator 14 corresponds to a selected micro instruction sequence for the translated macro instruction. Using this address, the ROM 16 begins providing the selected micro instruction sequence to the instruction register 20.

The instruction register 20 is a register which is used by later stages in the pipeline processor 10 to determine what functions to perform. The instruction register 20 contains a micro instruction, typically provided by the ROM 16.

The register stage of the pipeline accesses a register file 22, and/or a descriptor register file 24, as determined by the contents of the instruction register 20. Once accessed, the register file 22 latches selected contents into one or both of register latches 26, 28. The descriptor register file 24 provides its output into a descriptor latch 30. The contents of the latches 26, 28 and 30 may then be used in later stages of the pipeline.

If a memory address needs to be calculated from the operands, this is performed during the address stage. For example, if the memory location of interest needs to be calculated from values stored in latches 26, 28 or 30, these values are provided to the 3 way adder 32. The output of the adder 32 is latched at the end of the address stage in latch 34.

During the data stage, either the address calculated during the address stage is provided to the data cache 36 (which reads or stores data at the calculated address), or the operands within latches 26, 28 are provided as inputs to the ALU 38. At the end of the data stage, the output of the ALU 38, or the output of the data cache 36, is latched into the result register 40.

During the write back stage, the data contained in the result register 40 is written back, either to the data cache 36, or to the register file 22.

At this point, all of the stages of the pipeline processor 10 have been discussed. However, the above description assumed that all micro instructions for the pipeline were provided by the ROM 16. This is not always the case. In some modern processors, the translator 14 often provides a first micro instruction to the instruction register 20 while subsequent micro instructions are provided by the ROM 16. Depending on the speed of the translator 14, and that of the ROM 16, the translator 14 may provide an entire sequence of micro instructions to the instruction register 20. A mux 42 (shown in FIG. 2) selects between the translator 14 output, and the ROM 16 output, for input to the instruction register.

Figure 2:
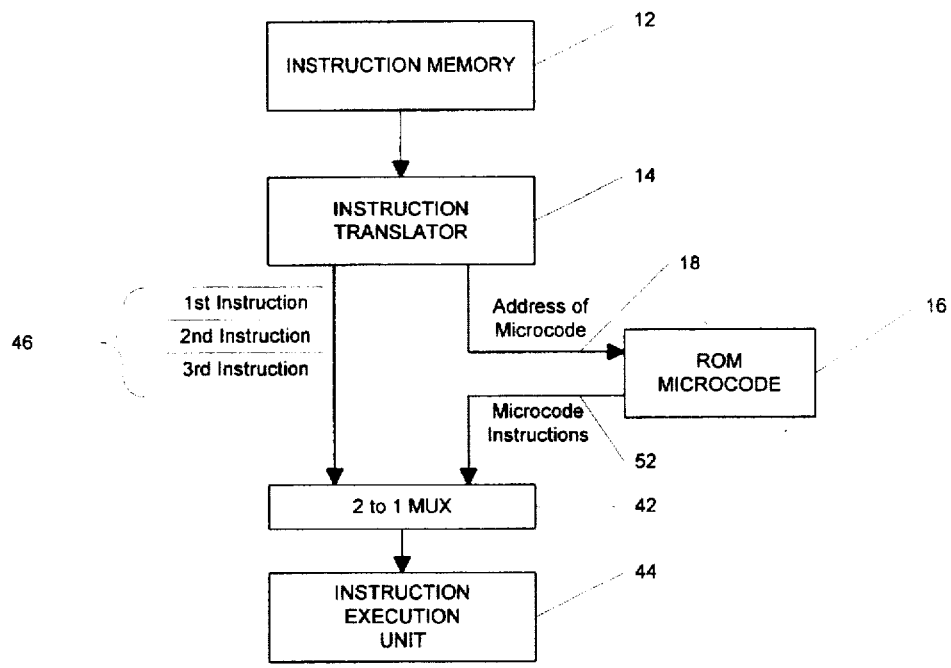
FIG. 2 is a block diagram illustrating a translator, a control unit and an execution unit within the pipeline processor of FIG. 1.

Now referring to FIG. 2, a more detailed diagram of the translator 14 and ROM 16 is shown. As discussed above, a macro instruction is fetched from instruction memory 12. This instruction is provided to the translator 14. For each macro instruction, the translator 14 generates micro instructions in one of 3 ways.

In a first method, the translator 14 generates an address signal on address line 18 which selects a sequence of micro instructions stored in the ROM 16. The micro instructions are then provided by the ROM 16 to a MUX 42. The MUX 42 selects the output of the ROM 16 for input into an instruction execution unit 44. Each micro instruction is thus provided, in sequence, from the ROM 16 to the execution unit 44. After a micro instruction sequence has been executed, another macro instruction can be translated, and the process continues.

In a second method, the translator 14 generates the micro instruction sequence 46 directly. In this method, the ROM 16 is not accessed. The MUX 42 selects the output sequence 46 for execution by the instruction execution unit 44.

In a third method, the translator 14 generates the first micro instruction in a sequence, and possibly the second instruction in a sequence, but also generates an address to the ROM 16. This allows the ROM 16 to provide subsequent micro instructions, corresponding to the macro instruction in the translator 14, to the execution unit 44. The MUX 42 selects between the output of the translator 14 and the ROM 16, whichever is appropriate.

As discussed in the Background above, one of the problems associated with translator generated micro instructions, is that those instructions have no addresses associated with them. Since they have no address, if they create an exception condition, there is no mechanism to allow the processor to locate an appropriate correction routine. What is discussed below, with reference to FIG.'s 3 and 4, is a mechanism, and exception location convention, that allows correction routines to be located for translator 14 or ROM 16 generated micro instructions.

Figure 3:
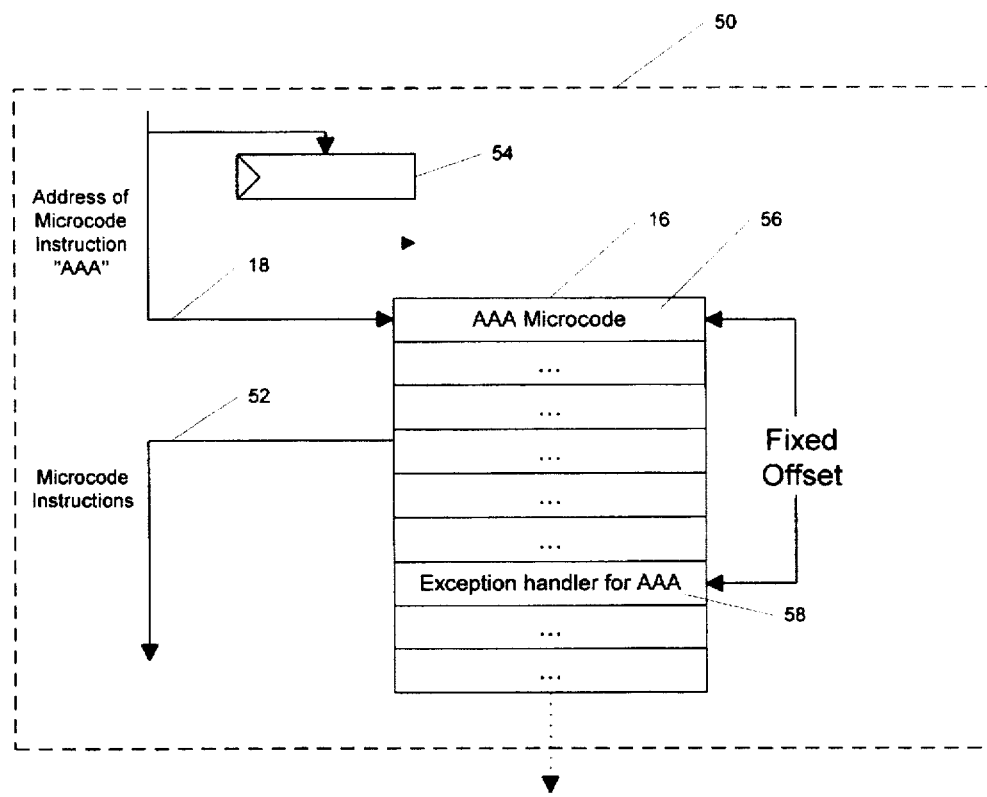
FIG. 3 is a block diagram illustrating the control unit, and particularly the control ROM of the present invention.

Now referring to FIG. 3, a control unit 50 is shown. The control unit 50 contains the ROM 16, the input address line 18, and an output 52. As before, the translator 14 generates an address on address line 18 which references particular micro instruction sequences stored in the ROM 16 which implement the operation required by the macro instruction. In addition, the control unit 50 contains an address register 54 which is connected to the address line 18. The address register 54 stores the address transmitted to the ROM 16 via the address line 18. The address register 54 can then be read by internal logic (not shown) should the processor 10 require knowledge of its contents.

As discussed above with reference to FIG. 2, the translator 14 can either: 1) transmit an address to the ROM 16 for execution of a micro instruction sequence; 2) generate a micro instruction sequence directly to the instruction execution unit 44; or 3) begin transmitting micro instructions to the execution unit 44, and provide an address to the ROM 16 for subsequent micro instructions. For each of these methods, it is possible that the micro instructions which are received by the execution unit 44 cause an exception to occur. On the occurrence of an exception, it may be necessary to determine which micro instruction sequence caused the exception, and if required, to execute an exception correction routine which corrects or restores any conditions which have been modified by the micro instruction sequence which caused the exception.

In one embodiment of the present invention, an offset convention is established which places appropriate exception correction routines within the ROM 16 at fixed offsets from the micro instruction sequences which can cause exceptions. For example, if a micro instruction sequence AAA 56 is stored in the ROM 16 at a start address XXXX, then the appropriate exception correction routine 58 for the micro instruction sequence AAA 56 is stored at a start address XXXX+Y, where Y is the fixed offset. Thus, for ROM 16 generated micro instructions, the address for the micro instruction sequence causing an exception can be found by reading the register 54. Then, an exception correction routine applicable for the offending instruction can be located by adding the fixed offset Y to the value found in register 54.

In addition, for the other 2 micro instruction generation methods discussed above, where the translator 14 is responsible for generating part, or all of a micro instruction sequence, the translator 14 also generates an address to the ROM 16 via line 18. The translator generated address, in this instance, is predetermined to have a value which is offset from the appropriate exception correction routine by a fixed offset Y. This value is stored into register 54, and may be read as discussed above. Thus, for both translator 14 generated micro instructions, and for ROM 16 provided micro instructions, applicable exception correction routines may be located by reading register 54, and applying a fixed offset Y.

Figure 4:
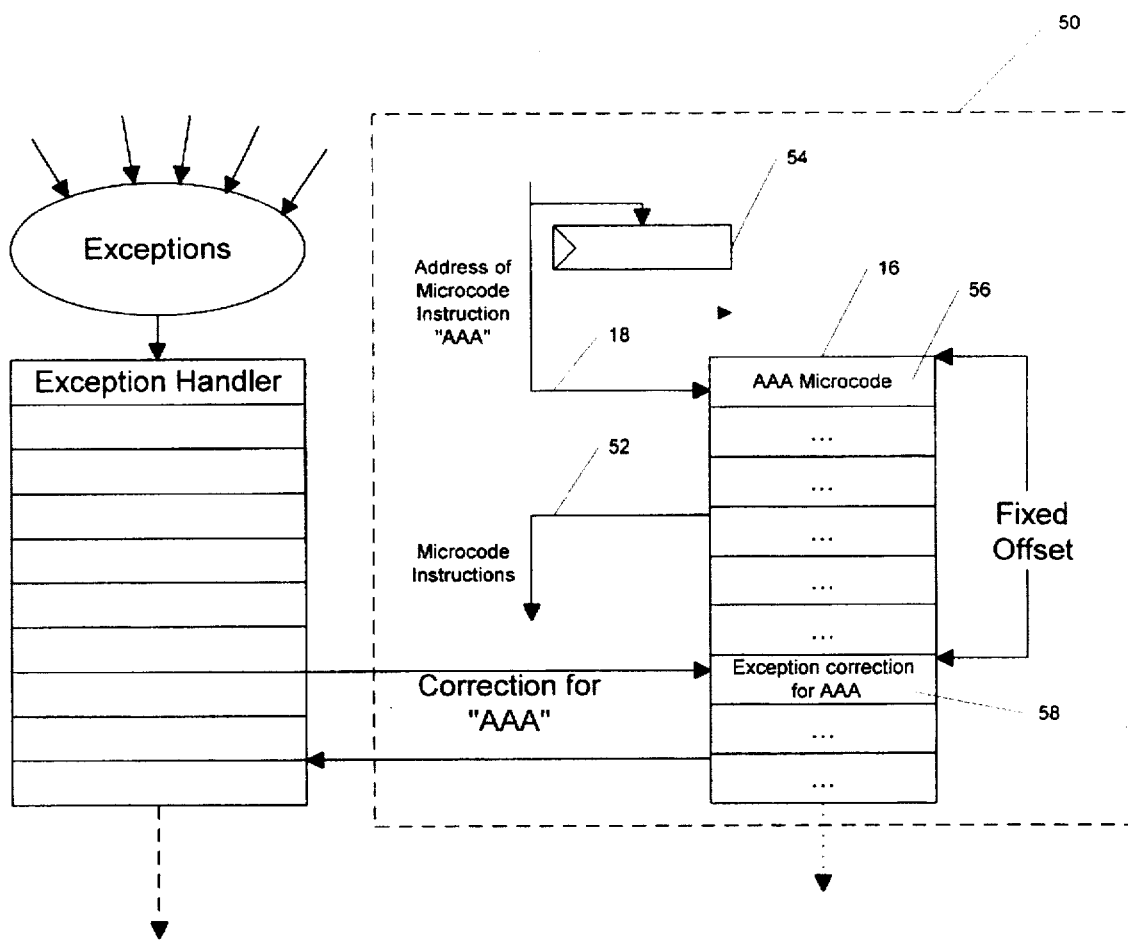
FIG. 4 is a block diagram illustrating an exception handler accessing the control unit of the present invention.

Now referring to FIG. 4, the operation of the present invention may be illustrated. An address signal is generated by the translator 14 on the address line 18 which references a micro instruction sequence AAA 56. The address is stored in register 54. In this instance, the address could refer either to a location within the ROM 16 which stores the micro instruction sequence AAA 56, or it could simply be an offset from an appropriate exception correction routine 58 (for a translator 14 generated micro instruction sequence AAA). If during execution, the micro instruction sequence AAA 56 causes an exception, the processor 10 may enter an exception stage at block 60. An exception handler 62 begins execution. At the point where the exception handler requires an exception correction routine to be executed, the address stored in register 54 is used, with the offset value Y, to branch to the exception correction routine 58. At the end of the exception correction routine 58, the address handler 62 continues execution. Thus, by using a convention for locating exception correction routines at a fixed offset from an address associated with particular micro instructions, appropriate exception correction routines may always be found and executed, whether the offending micro instructions are generated by the translator 14 or by the ROM 16.

Although the present invention has been described in considerable detail with reference to certain preferred versions thereof, other versions are possible. For example, the translator 14 could be any device which is capable of generating both an address signal, and micro instructions. In addition, the location of the register 54 may reside in a location other than within the control unit 50. For example, register 54 may reside in the translator, or within hardware associated with exception handling. What should be appreciated is that the present invention provides a system which allows a processor to associate a sequence of exception routines with a sequence of micro instructions, whether the source of the micro instruction sequence is a translator or a ROM. In addition, the present invention provides a mechanism for associating a first set of micro instructions with a second set of micro instructions, where the first set of micro instructions may be generated by two separate devices (e.g., a translator or a ROM), and where the first set of micro instructions may not have an original address.

Although the present invention and its advantages have been described in detail, it should be understood that various changes, substitutions and alterations can be made herein without departing from the spirit and scope of the invention as defined by the appended claims.

We claim:

1. A processor for executing macro instructions wherein the macro instructions are translated into micro instructions, and wherein the micro instructions cause the processor to generate exceptions that require execution of exception routines, the exception routines having exception correction routines, the processor comprising:

an instruction memory;

an instruction execution unit;

a translator, connected to said instruction memory, for receiving the macro instructions from said instruction memory, for generating first micro instructions relating to the macro instructions, and for generating a first address associated with second micro instructions, the first address at a predetermined offset from associated exception correction routines;

a ROM; connected to said translator, for receiving from said translator said first address, and for providing as output said second micro instructions; and a MUX, having inputs connected to said translator and to said ROM, and an output connected to said instruction execution unit, for selecting instructions between said translator and said ROM, and having as an output either of said first micro instructions or said second micro instructions;

wherein said first address is used by the processor, with said predetermined offset, to locate said associated exception correction routines.

2. The processor as recited in claim 1, wherein said translator also generates a second address, not associated with said second micro instructions, said second address at a predetermined offset from said associated exception correction routines.

3. The processor as recited in claim 2, wherein said associated exception correction routines are located by said exception routines by reference to either of said first address or said second address.

4. The processor as recited in claim 2, wherein said associated exception correction routines are located at a fixed offset address relative to said first address or said second address.

5. The processor as recited in claim 2, wherein said processor further comprises:

a register, connected to said translator, for temporarily storing either of said first or said second address.

6. The processor as recited in claim 5, wherein said exception routines locate said associated exception correction routines by reference to said first address or said second address stored in said register.

7. The processor as recited in claim 1, wherein said first micro instructions generated by said translator, and said second micro instructions provided by said ROM, both correspond to the macro instructions stored in said instruction memory.

8. The processor as recited in claim 1, wherein said translator generates one or more of said first micro instructions relating to the macro instructions faster than said ROM provides said second micro instructions.

9. The processor as recited in claim 1, wherein for at least a portion of the macro instructions, said translator generates said first address associated with said second microinstructions, but does not generate said first micro instructions.

10. The processor as recited in claim 1, wherein for at least a portion of the macro instructions, said translator generates said first micro instructions relating to the macro instructions, and said ROM does not provide said second micro instructions.

11. The processor as recited in claim 1, wherein said exception correction routines comprise a plurality of micro instruction routines which are called by said exception routines for execution by said instruction execution unit.

12. The processor as recited in claim 11, wherein said exception correction routines are stored in said ROM.

13. The processor as recited in claim 1, wherein said macro instructions are compatible with x86 microprocessors.

14. A microprocessor for executing macro instructions, and for executing exception routines that require exception correction routines, the microprocessor comprising:

a control ROM for providing micro instructions, associated with the macro instructions, to an instruction execution unit, and for storing the exception correction routines;

a translator, connected to said control ROM, for receiving the macro instructions from a source thereof, and for generating an address to said control ROM, the address comprising:

a first address, associated with a location within said control ROM which contains said micro instructions relating to the macro instructions; or a second address, not associated with any location within said control ROM relating to the macro instructions;

wherein said first address and said second address are at a fixed offset relative to the exception correction routines; and an instruction execution unit connected to said translator and to said control ROM, for executing said micro instructions.

15. The microprocessor as recited in claim 14, wherein said translator generates micro instructions directly to said instruction execution unit.

16. The microprocessor as recited in claim 15, wherein said translator generates said second address to said control ROM when said translator generates said micro instructions to said instruction execution unit.

17. The microprocessor as recited in claim 16, wherein said exception correction routines corrects register values changed by said micro instructions.

18. The microprocessor as recited in claim 17, wherein said register values are values contained within addressable registers within said microprocessor.

19. A control unit within a processor, the processor having a translator and an execution unit, the control unit comprising:

a control ROM, connected to the translator via an address line, said control ROM for storing micro instructions, for storing exception correction routines, and for providing said micro instructions to the execution unit; and a register, connected to the translator via said address line, for temporarily storing address values generated by the translator;

whereby said address values generated by the translator are occasionally used to reference said micro instructions; and whereby said address values temporarily stored in said register are used to locate said exception correction routines.

20. The microprocessor as recited in claim 19, wherein said exception correction routines are located within said control ROM at fixed offsets relative to said address values temporarily stored in said register.

21. The microprocessor as recited in claim 19, wherein said register is addressable by the processor for determining the location of said exception correction routines.

22. A method for locating exception correction routines for translator generated micro instructions, the steps comprising:

placing the exception correction routines within a control ROM at addressable locations;

generating an exception address for translator generated micro instructions;

sending the exception address to the control ROM;

storing the generated exception address in a register;

upon the occurrence of an exception, reading the exception address stored in the register; and determining from the exception address the location of the exception correction routines.

23. The method as recited in claim 22, wherein said step of determining further comprises:

adding to the read address a fixed offset to obtain the address for the exception correction routine.

24. The method as recited in claim 22, wherein said step of generating an address further comprises:

determining appropriate addresses for exception correction routines corresponding to translator generated micro instructions.

\* \* \* \* \*